(12) United States Patent
Kim et al.

(10) Patent No.: US 9,027,071 B2
(45) Date of Patent: May 5, 2015

(54) METHOD AND APPARATUS FOR INSERTING BROADCAST PROGRAM BY DETECTING AVAILABLE CHANNEL OVER HYBRID FIBER COAX NETWORK OR OPTICAL CABLE NETWORK

(71) Applicant: Electronics and Telecommunications Research Institute, Daejeon (KR)

(72) Inventors: Yang Su Kim, Daejeon (KR); Han Seung Koo, Daejeon (KR); Jae Ho Lee, Daejeon (KR); Sang Jung Ra, Daejeon (KR); Dong Joon Choi, Daejeon (KR); Nam Ho Hur, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/868,674

(22) Filed: Apr. 23, 2013

(65) Prior Publication Data

US 2013/0283331 A1    Oct. 24, 2013

(30) Foreign Application Priority Data

Apr. 23, 2012  (KR) .................. 10-2012-0042025

(51) Int. Cl.
*H04N 21/2385* (2011.01)
*H04N 21/2383* (2011.01)
*H04N 21/61* (2011.01)
*H04H 20/06* (2008.01)
*H04H 60/41* (2008.01)

(52) U.S. Cl.
CPC ....... *H04N 21/2385* (2013.01); *H04N 21/2383* (2013.01); *H04N 21/6118* (2013.01); *H04H 20/06* (2013.01); *H04H 60/41* (2013.01)

(58) Field of Classification Search
CPC .................. H04N 21/2385; H04N 21/235
USPC ..................................................... 725/116
See application file for complete search history.

(56) References Cited

U.S. PATENT DOCUMENTS

2006/0250935 A1 * 11/2006 Hamamoto et al. .......... 370/203
2007/0022460 A1 *  1/2007 Kim et al. .................... 725/128
2010/0309805 A1 * 12/2010 Jones et al. .................. 370/252

* cited by examiner

*Primary Examiner* — Jefferey Harold
*Assistant Examiner* — Justin Sanders
(74) *Attorney, Agent, or Firm* — William Park & Associates Ltd.

(57) ABSTRACT

An apparatus for combining a broadcasting channel may include a channel detector to detect a vacant Radio Frequency (RF) broadcasting channel used by a photoelectric converter that converts a first broadcast program as an optical signal to a first RF signal, a broadcast receiving interface to receive at least one second broadcast program, a broadcast modulator to generate a second RF signal by modulating the second broadcast program using the vacant RF broadcasting channel, and a channel combiner to combine a broadcasting channel used for the first RF signal and the vacant RF broadcasting channel.

17 Claims, 5 Drawing Sheets

FIG. 4
410
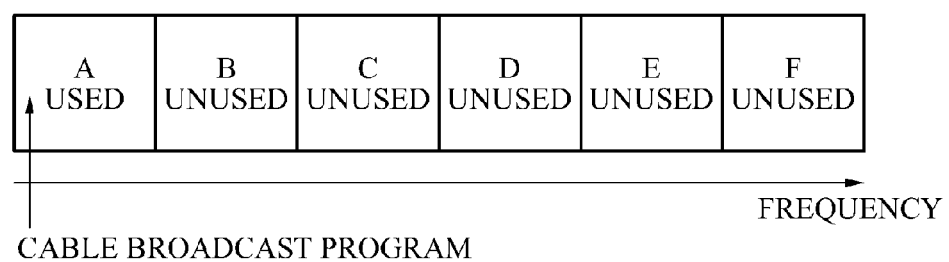
CABLE BROADCAST PROGRAM
420
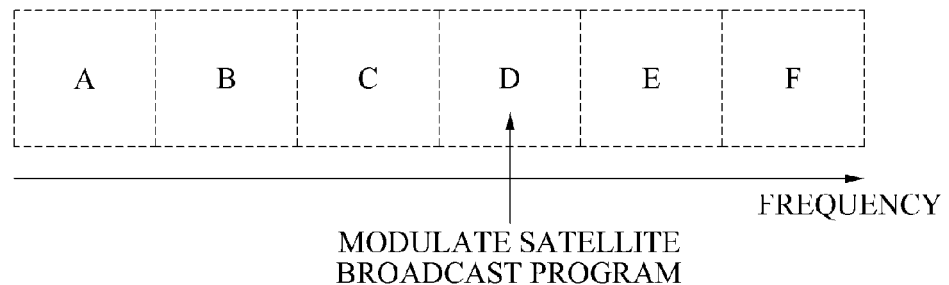
MODULATE SATELLITE
BROADCAST PROGRAM

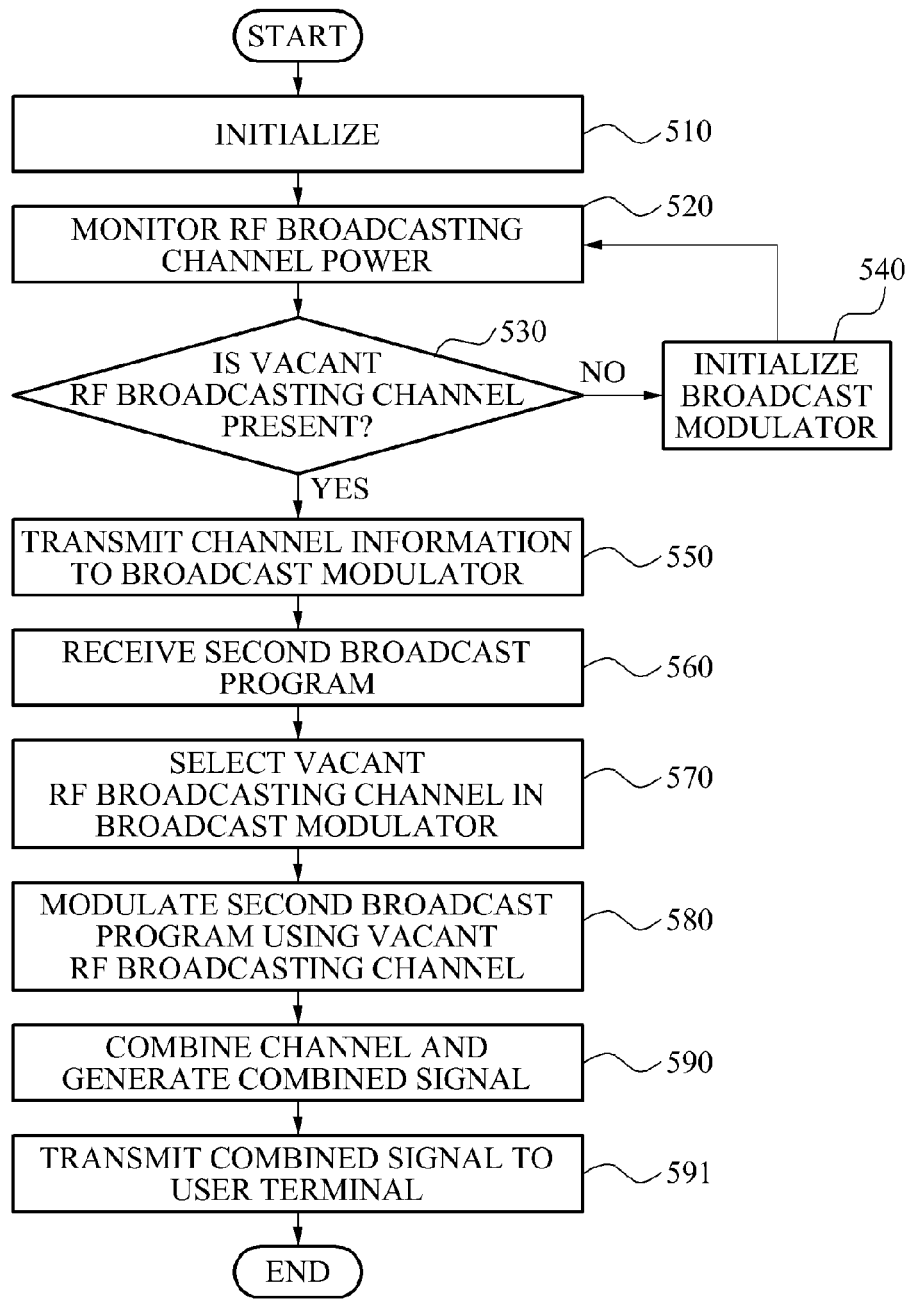

METHOD AND APPARATUS FOR INSERTING BROADCAST PROGRAM BY DETECTING AVAILABLE CHANNEL OVER HYBRID FIBER COAX NETWORK OR OPTICAL CABLE NETWORK

CROSS-REFERENCE TO RELATED APPLICATION

This application claims the priority benefit of Korean Patent Application No. 10-2012-0042025, filed on Apr. 23, 2012, in the Korean Intellectual Property Office, the disclosure of which is incorporated herein by reference.

BACKGROUND

1. Field of the Invention

The present invention relates to a method and apparatus for inserting a broadcast program by detecting available channels over a hybrid fiber coax network or an optical cable network.

2. Description of the Related Art

An optical cable network and a hybrid fiber coax network are considered efficient networks for transmitting high quality data. The optical cable network and the hybrid fiber coax network may include a plurality of entities such as a head-end system, a photoelectric converter, and the like. The "optical cable network" described herein may include the optical cable network or the hybrid fiber coax network, and a "cable broadcasting system" herein may include an "optical cable broadcasting system" or a "broadcasting system based on a hybrid fiber coax network".

A broadcast program transmitted from the head-end system may be delivered to the photoelectric converter in a form of an optical signal, and the photoelectric converter may convert the optical signal to a Radio Frequency (RF) signal. An intermediate amplifier may include a plurality of stages, and amplify the RF signal converted in the photoelectric converter to a signal level corresponding to the signal level that is able to be received by a user terminal.

The user terminal may function to demodulate a broadcast program based on an appropriate standard, for example, the ITU-T J.83 transmission standard, and the like. Here, a total range of a frequency band from the head-end system to the user terminal is not used. Accordingly, there exists a need for utilizing unused frequency resources efficiently.

SUMMARY

According to an aspect of the present invention, there is provided an apparatus for combining a broadcast program, the apparatus including a channel detector to detect a vacant Radio Frequency (RF) broadcasting channel from RF broadcasting channels used by a photoelectric converter that converts a first broadcast program as an optical signal to a first RF signal, a broadcast receiving interface to receive at least one second broadcast program, a broadcast modulator to generate a second RF signal by modulating the second broadcast program using the vacant RF broadcasting channel, and a channel combiner to combine a broadcasting channel used for the first RF signal and the vacant RF broadcasting channel.

The apparatus for combining the broadcast program may further include a transmission interface to transmit, to a user terminal using the combined channel, a combined signal including the first RF signal and the second RF signal.

The channel detector may detect the vacant RF broadcasting channel from the RF broadcasting channel by monitoring a power level of the first RF signal.

The channel detector may provide information with respect to the vacant RF broadcasting channel to the broadcast modulator.

The broadcast modulator may be initialized in response to an absence of the vacant RF broadcasting channel.

The broadcast receiving interface may be activated in response to a presence of the vacant RF broadcasting channel.

The at least one second broadcast program may include at least one of a satellite broadcast program, a terrestrial broadcast program, and user created contents.

According to an aspect of the present invention, there is provided a cable broadcasting system, including a head-end system to transmit a first broadcast program as an optical signal, using an optical cable, a photoelectric converter to convert the first broadcast program to a first Radio Frequency (RF) signal, and an apparatus for combining a broadcast program, wherein the apparatus for combining the broadcast program includes a broadcast receiving interface to receive at least one second broadcast program, a broadcast modulator to generate a second RF signal by modulating the second broadcast program using the vacant RF broadcasting channel, and a channel combiner to combine a broadcasting channel used for the first RF signal and the vacant RF broadcasting channel.

The cable broadcasting system may further include an intermediate amplifier to amplify a combined signal including the first RF signal and the second RF signal that are transmitted using the combined channel.

The apparatus for combining the broadcast program may further include a transmission interface to transmit, to a user terminal using the combined channel, the combined signal including the first RF signal and the second RF signal.

The broadcast modulator may be initialized in response to an absence of the vacant RF broadcasting channel.

The broadcast receiving interface may be activated in response to a presence of the vacant RF broadcasting channel.

The at least one second broadcast program may include at least two of a satellite broadcast program, a terrestrial broadcast program, and user created contents.

According to an aspect of the present invention, there is provided a method for combining a broadcast program, the method including detecting a vacant Radio Frequency (RF) broadcasting channel from RF broadcasting channels used by a photoelectric converter that converts a first broadcast program as an optical signal to a first RF signal, generating information with respect to the vacant RF broadcasting channel, receiving at least one second broadcast program, using a broadcast receiving interface, generating a second RF signal by modulating the second broadcast program using the vacant RF broadcasting channel, by a broadcast modulator, and combining a broadcasting channel used for the first RF signal and the vacant RF broadcast signal.

The method for combining the broadcast program may further include initializing the broadcast modulator in response to an absence of the vacant RF broadcasting channel.

The method for combining the broadcast program may further include activating the broadcast receiving interface in response to a presence of the vacant RF broadcasting channel.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 4 illustrates an example of combining broadcasting channels according to an embodiment of the present invention; and FIG. 5 is a flowchart illustrating a method for combining a broadcast program according to an embodiment of the present invention.

DETAILED DESCRIPTION

Figure 1:
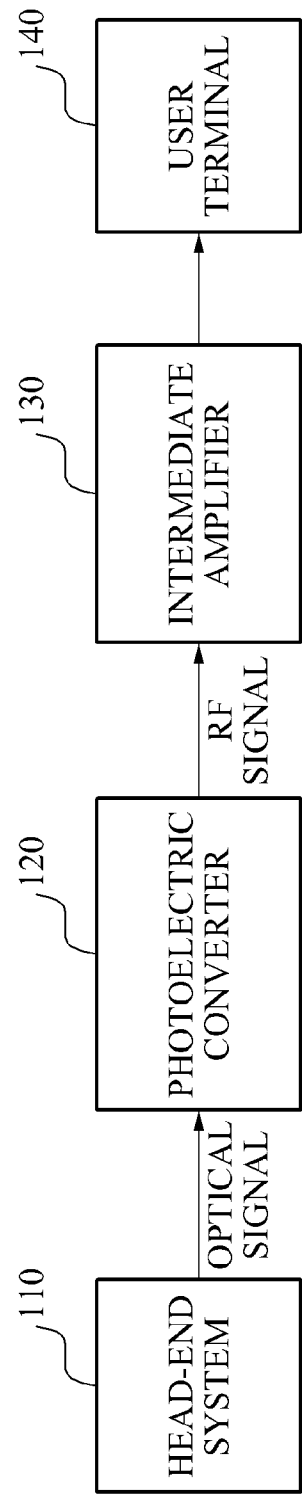
FIG. 1 is a block diagram illustrating a cable broadcasting system according to a related art.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a block diagram illustrating a cable broadcasting system according to a related art.

Referring to FIG. 1, the cable broadcasting system may include a head-end system 110, a photoelectric converter 120, an intermediate amplifier 130, and a user terminal 140.

The head-end system 110 may transmit a broadcast program in a form of an optical signal. Here, the photoelectric converter 120 may convert the optical signal to a Radio Frequency (RF) signal, and amplify the converted RF signal to a signal level corresponding to the signal level that is able to be received by the user terminal 140. Here, the intermediate amplifier 130 may include a plurality of stages. The user terminal 140 may be provided by various standards such as ITU-T J.83, and the like, and function to demodulate the broadcast program.

A total range of frequency resources may not be used in a path ranging from the head-end system 110 to the user terminal 140. That is, using only a portion of a total of channels may be inefficient.

Figure 2:
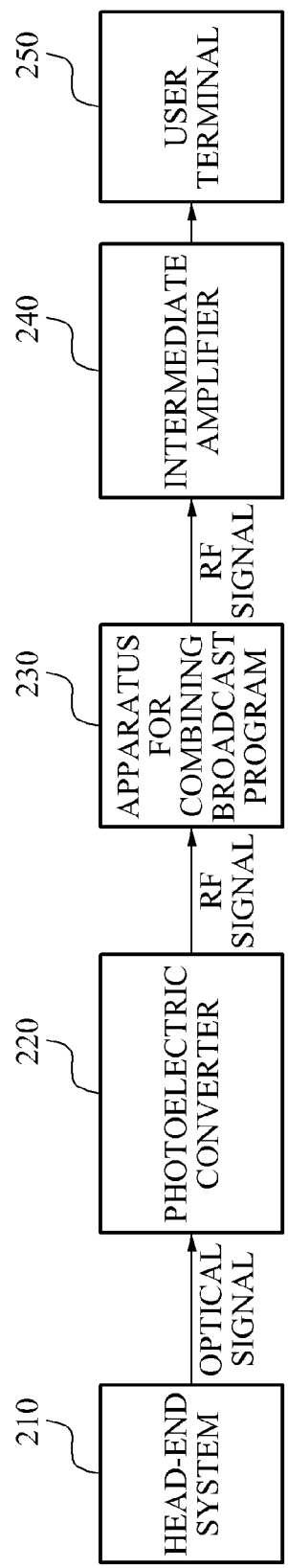
FIG. 2 is a block diagram illustrating a cable broadcasting system according to an embodiment of the present invention.

FIG. 2 is a block diagram illustrating a cable broadcasting system according to an embodiment of the present invention.

Referring to FIG. 2, the cable broadcasting system may include a head-end system 210, a photoelectric converter 220, an apparatus for combining a broadcast program 230, an intermediate amplifier 240, and a user terminal 250.

The head-end system 210 may transmit a first broadcast program in a form of an optical signal, using a portion of a total of RF broadcasting channels, and convert the first broadcast program to a first RF signal.

The apparatus for combining the broadcast program 230 may detect a vacant RF broadcasting channel from the total of RF broadcasting channels. Here, the vacant RF broadcasting channel may be a channel unused by the head-end system 210. More particularly, the apparatus for combining the broadcast program 230 may detect the vacant RF broadcasting channel, by monitoring a power level of the first RF signal from the total of RF broadcasting channels. For example, when the power level detected from a specific RF broadcasting channel is less than a predetermined threshold value, the specific RF broadcasting channel may be detected to be the vacant RF channel.

The apparatus for combining the broadcast program 230 may receive at least one second broadcast program. Here, a type of the at least one second broadcast program may differ from a type of the first broadcast program. For example, the first broadcast program may be a cable broadcast program, and the at least one second broadcast program may include at least one of a satellite broadcast program, a terrestrial broadcast program, and user created contents.

The apparatus for combining the broadcast program 230 may generate a second RF signal by modulating the second broadcast program, using the vacant RF broadcasting channel, and combine a broadcasting channel used for the first RF signal and the vacant RF broadcasting channel. A combined signal including the first RF signal and the second RF signal may be transmitted to the user terminal 250 through the intermediate amplifier 240, using the combined channel.

Figure 3:
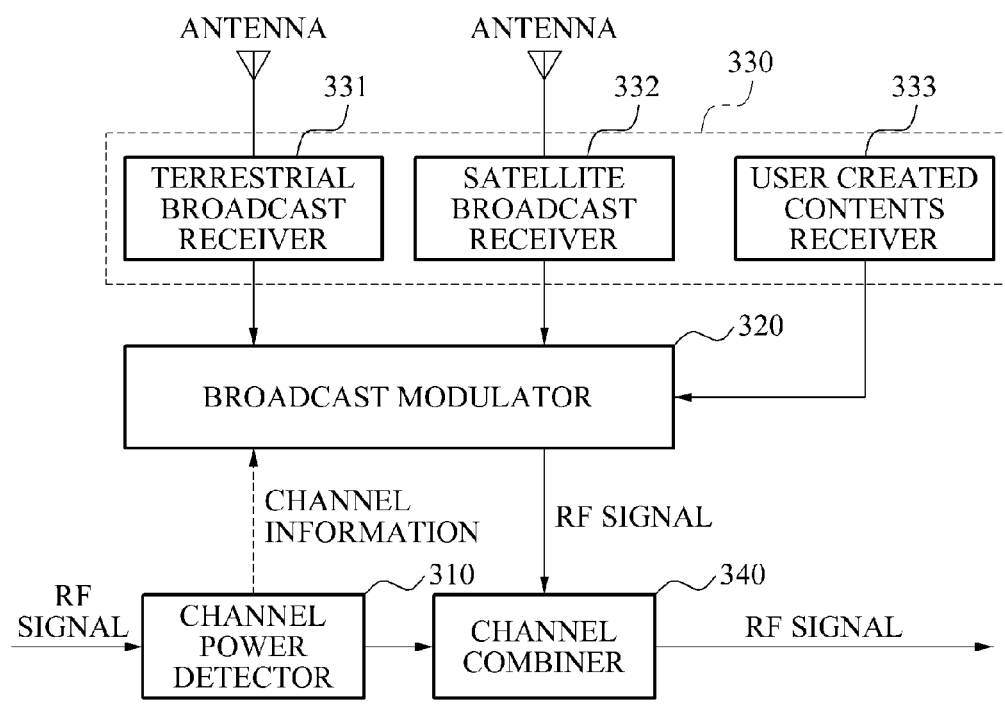
FIG. 3 is a block diagram illustrating an apparatus for combining a broadcast program according to an embodiment of the present invention.

FIG. 3 is a block diagram illustrating an apparatus for combining a broadcast program according to an embodiment of the present invention.

Referring to FIG. 3, the apparatus for combining the broadcast program may include a channel power detector 310, a broadcast modulator 320, a broadcast receiving interface 330, and a channel combiner 340.

The channel power detector 310 may be referred to as a channel detector, and detect a vacant RF broadcasting channel from RF broadcasting channels used by a photoelectric converter that converts a first broadcast program from an optical signal to a first RF signal. The channel power detector 310 may detect the vacant RF broadcasting channel from the RF broadcasting channels, by monitoring a power level of the first RF signal.

When the vacant RF broadcasting channel is detected, information with respect to the vacant RF broadcasting channel may be provided to the broadcast modulator 320.

Also, the broadcast receiving interface 330 may receive at least one second broadcast program. Here, the at least one second broadcast program may include a satellite broadcast program, a terrestrial broadcast program, and user created contents. When the vacant RF broadcasting channel exists, the broadcast receiving interface 330 may be activated in response to a presence of the vacant RF broadcasting channel.

Further, the broadcast modulator 320 may generate a second RF signal by modulating the second broadcast program, using the vacant RF broadcasting channel. When the vacant RF broadcasting channel is absent, the broadcast modulator 320 may be initialized in response to the absence of the vacant RF broadcasting channel.

Also, the channel combiner 340 may combine a broadcasting channel used for the first RF signal and the vacant RF broadcasting channel. A transmission interface (not shown) may transmit a combined signal including the first RF signal and the second RF signal to the user terminal, using the combined channel.

FIG. 4 illustrates an example of combining broadcasting channels according to an embodiment of the present invention.

Referring to a channel map 410 of FIG. 4, a broadcasting channel A among broadcasting channels of A, B, C, D, E, and F may be used for a cable broadcast program. That is, the broadcasting channels of A, B, C, D, E, and F may be considered vacant broadcasting channels.

Referring to a channel map 420, an apparatus for combining a broadcast program according to an embodiment of the present invention may determine that the broadcasting channel D is employed among the vacant broadcasting channels. The broadcasting channel D may be used for a satellite broadcast program that is a second broadcast program.

The broadcasting channels A and D may be combined, and the cable broadcast program and the satellite broadcast program may be transmitted while being combined.

FIG. 5 is a flowchart illustrating a method for combining a broadcast program according to an embodiment of the present invention.

Referring to FIG. 5, in operation 510, the apparatus for combining the broadcast program may be initialized. Further, in operation 520, the apparatus for combining the broadcast program may monitor a power level of a signal in a total of RF broadcasting channels. Here, in operation 530, the apparatus for combining the broadcast program may determine a presence of a vacant RF broadcasting channel. In operation 540, a broadcast modulator may be initialized when the vacant broadcasting channel is absent, and operation 520 is implemented again. In operation 550, channel information with respect to the vacant RF broadcasting channel may be transmitted to the broadcast modulator when the vacant broadcasting channel is present.

A broadcast receiving interface may be activated in response to the presence of the vacant RF broadcasting channel, and in operation 560, the broadcast receiving interface may receive a second broadcast program. In operation 570, the broadcast modulator may select the vacant RF broadcasting channel, using the channel information with respect to the vacant RF broadcasting channel. Further, in operation 580, the broadcast modulator may modulate the second broadcast program, using the vacant RF broadcasting channel.

Subsequently, in operation 590, a channel may be combined, and a combined signal may be transmitted to a user terminal in the combined channel.

According to embodiments of the present invention, it is possible to utilize frequency resources efficiently in a hybrid fiber coax network or an optical cable network, by combining or inserting a first broadcast program and a second broadcast program such as a cable broadcast program, using available channels adaptively.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for use in communicating broadcast programs over Radio Frequency (RF) broadcasting channels, with use of a photoelectric converter configured to convert a first broadcast program as an optical signal to a first RF signal which is broadcasted over a first broadcasting channel, the apparatus comprising:
   a channel detector configured to detect, from the RF broadcasting channels, a vacant Radio Frequency (RF) broadcasting channel (hereinafter a "second broadcasting channel");
   a receiving interface configured to receive at least one second broadcast program;
   a modulator configured to generate a second RF signal by modulating the second broadcast program over the second broadcasting channel;
   a channel combiner configured to combine the first broadcasting channel used for the first RF signal with the second broadcasting channel; and
   a transmission interface configured to broadcast, over the second broadcasting channel, both the first RF signal and the second RF signal for receipt by a user terminal.

2. The apparatus of claim 1, wherein the first and the second RF signals are time-multiplexed over the second broadcasting channel for receipt by the user terminal.

3. The apparatus of claim 1, wherein the channel detector is further configured to detect the vacant RF broadcasting channel by monitoring a power level of an RF signal over the second broadcasting channel.

4. The apparatus of claim 1, wherein the channel detector is further configured to provide information with respect to the second broadcasting channel to the broadcast modulator.

5. The apparatus of claim 1, wherein the modulator is further configured to initialize in response to an absence of the vacant RF broadcasting channel.

6. The apparatus of claim 1, wherein the receiving interface is configured to be activated in response to a presence of the vacant RF broadcasting channel.

7. The apparatus of claim 1, wherein the at least one second broadcast program comprises at least one of a satellite broadcast program, a terrestrial broadcast program, and user created contents.

8. A cable broadcasting system, comprising:
   a head-end system configured to transmit a first broadcast program as an optical signal over an optical cable;
   a photoelectric converter configured to convert the first broadcast program to a first Radio Frequency (RF) signal which is broadcasted over a first broadcasting channel; and
   an apparatus comprising:
      a channel detector configured to detect, from RF broadcasting channels, a vacant RF broadcasting channel (hereinafter a "second broadcasting channel");
      a receiving interface configured to receive at least one second broadcast program;
      a modulator configured to generate a second RF signal by modulating the second broadcast program over the second RF broadcasting channel;
      a channel combiner configured to combine the first broadcasting channel used for the first RF signal with the second broadcasting channel; and
      a transmission interface configured to broadcast, over the second broadcasting channel, both the first RF signal and the second RF signal for receipt by a user terminal.

9. The cable broadcasting system of claim 8, further comprising:
   an intermediate amplifier configured to amplify the first RF signal and the second RF signal that are broadcasted over the second broadcasting channel.

10. The cable broadcasting system of claim 8, wherein
the first RF signal and the second RF signal are time-multiplexed over the second broadcasting channel for receipt by the user terminal.

11. The cable broadcasting system of claim 8, wherein the modulator is further configured to be initialized in response to an absence of the vacant RF broadcasting channel.

12. The cable broadcasting system of claim 8, wherein the receiving interface is further configured to be activated in response to a presence of the vacant RF broadcasting channel.

13. The cable broadcasting system of claim 8, wherein the at least one second broadcast program comprises at least two of a satellite broadcast program, a terrestrial broadcast program, and user created contents.

14. A method for use in communicating broadcast programs over Radio Frequency (RF) broadcasting channels, the method comprising:
    converting a first broadcast program as an optical signal to a first RF signal which is broadcasted over a first broadcasting channel;
    detecting a vacant RF broadcasting channel (hereinafter a "second broadcasting channel") from the RF broadcasting channels;
    receiving at least one second broadcast program;
    generating a second RF signal by modulating the second broadcast program over the second broadcasting channel;
    combining the first broadcasting channel used for the first RF signal with the second broadcasting channel; and
    broadcasting, over the second broadcasting channel, both the first RF signal and the second RF signal for receipt by a user terminal.

15. The method of claim 14, further comprising:
    initializing a modulator to modulate the second broadcast program in response to an absence of the vacant RF broadcasting channel.

16. The method of claim 14, further comprising:
    activating a receiving interface to receive the at least one second broadcast program in response to a presence of the vacant RF broadcasting channel.

17. The method of claim 14, wherein the combining is performed by time-multiplexing the first and the second RF signals over the second broadcasting channel for receipt by the user terminal.

* * * * *